Per Johan Berggren.
INVENTOR.

BY Darby & Darby
ATTORNEYS.

Patented June 23, 1936

2,045,260

UNITED STATES PATENT OFFICE 2,045,260

SHUTTER AND SHUTTER ADJUSTMENT
FOR CAMERAS

Per Johan Berggren, Chicago, Ill.

Original application June 4, 1929, Serial No. 368,352. Divided and this application May 5, 1933, Serial No. 669,524

9 Claims. (Cl. 88—19.3)

This invention relates to motion picture cameras and has for its object the provision of an improved shutter structure and operation therefor for said motion picture cameras.

A further object is to provide an improved drive gear structure for operating the shutters of the motion picture camera.

A further object is to provide an improved control mechanism for the shutter driving gear whereby the degree of opening of the shutters may be adjustably varied and controlled manually as well as automatically.

A further object is to provide a shutter control mechanism which visually displays to the operator the relative relation of the shutters to each other at all times during the operation of the camera.

A further object is to provide safety devices for automatic shutter control.

A still further object is to provide an improved bearing structure for shutter operating shafts to permit and facilitate rotative as well as endwise sliding movement in either direction at the same time.

Other objects will appear more fully hereinafter. The invention consists substantially in the construction, combination, location, and relative arrangement of parts, all as will be more fully hereinafter set forth and pointed out in the appended claims, and as shown in the accompanying drawings, in which—

The same part is designated by the same reference numeral wherever it occurs throughout the several views.

Figure 1:
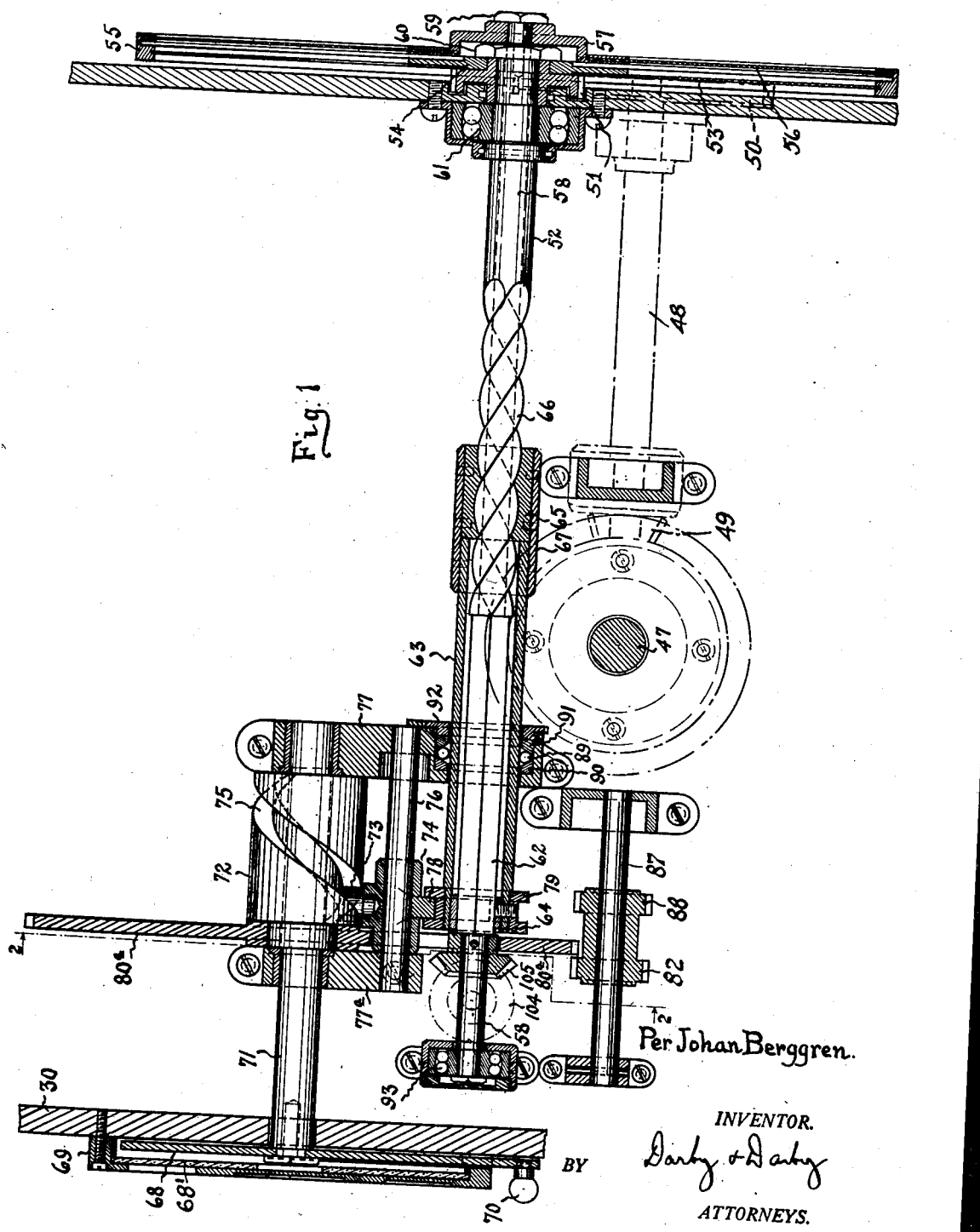
Figure 1 is a view taken on the line 1—1 of Fig. 2 and showing a preferred form of shutter control mechanism.

This application is a division of my application Serial No. 368,352, filed June 4, 1929, for "Motion picture cameras".

The present invention relates more particularly to camera shutter and shutter adjusting mechanism for use in cameras suitable for taking pictures of enlarged area for use in projecting apparatus, thereby increasing the visibility and distinctness of the projected pictures.

Referring now to the drawings, I will now describe the shutter mechanism employing the principles of my invention, including operating devices, drive gearing therefor, and the control for such gearing, the general object and purpose being to provide a most efficient and accurate shutter mechanism of simple structure capable of being easily assembled together, with a novel arrangement of drive gearing for operating the shutter members, and the provision of control mechanism by which the relative positions of the shutter members may be adjusted and maintained, either manually or automatically, to vary the area of shutter opening as exigency of use may require, as well as the duration of the shutter opening, and/or of the closure of the shutter opening. In carrying out this part of my invention I employ a main operating shaft indicated at 47, which is suitably mounted within the camera casing 30 and adapted to be driven, either manually or by motor, as may be desired.

In the particular arrangement shown, to which, of course, my invention is not to be limited or restricted, the main shaft 47 extends transversely within the camera casing 30. Mounted within the casing is a longitudinally extending shutter operating shaft 48, which is suitably geared to and driven from the main shaft 47, as for example by means of the intermeshing gears 49. A gear member 51 is mounted upon a reduced portion of the tubular shutter operating shaft 52. The gear 51 meshes with and is driven by gear 50 secured to shaft 48. Suitably mounted upon the gear member 51 is the inner shutter member 53. The mounting of this shutter member or disk upon the gear member 51 may be effected in many different ways. I have shown a simple, efficient and compact arrangement wherein the central hub portion of the inner shutter 53 is shown thickened or enlarged as at 54 and is received upon a short inner hub extension of the gear member 51, as clearly shown in Fig. 1. The outer peripheral edge of the inner shutter member 53 is engaged in an annular ring member 55 which serves to receive and hold the shutter against displacement or bulging, and also as a balance member for the inner shutter disk. The peripheral edge of the shutter member 53 may be conveniently swaged into an annular groove formed in the inner surface of the ring member 55. The hub ring 54, of the inner shutter member 53, may of course be secured in its mounted position upon the gear member 51 in any suitable or convenient way, as by means of rivets or otherwise.

The outer shutter disk member 56 is suitably secured to a cap member 57, which is mounted upon to rotate with a shaft 58, which extends longitudinally through the tubular shaft 52. The cap member 57 is held between a screw head 59 and gear member 51. If desired a lock nut 60 may be interposed between these members 57, 51, to serve as a retainer for holding the gear member 51 against its bearing shoulder on the shaft 52, or the adjacent ball bearing 61 for the shaft 52.

The two shutter disks 53, 56 are each in the form of a segment which extends through an annular space or distance of 180°, and, as usual, these disks are so relatively arranged and operated that their cut-away portions are brought into register with each other across the line of exposure to the film through the photographic lens.

In order to secure the best results in the operation of the shutters under varying conditions encountered in the use of motion picture cameras, it is exceedingly desirable to provide means whereby the shutters are rotatively adjustable relatively to each other with great accuracy, so as to vary the area of the registering openings therethrough, and hence varying the duration of the exposures. The simple and accurate control of this adjustment in motion picture cameras is of exceedingly great importance.

For rotatively actuating the shaft 58 which carries the outer shutter disk 56, I extend the inner end of said shaft 58 through and beyond the inner end of the outer shutter shaft 52, as indicated at 62, Fig. 1. Upon this extended portion of the shaft, which, in the form shown, is preferably square, I mount the longitudinally movable sleeve member 63 carrying at one end a square nut 64 which engages the square cross section portion 62 of said shaft 58. The opposite end of the sleeve 63 carries a spiral nut 65 which embraces a spiral portion 66 formed in the exterior surface of the hollow shaft 52. The sleeve 63 is mounted for axial rotative movement, as well as longitudinal sliding movement. From this construction it will be seen that when the shaft 66 is rotated the sleeve 63 will rotate with it, and therefore will not be displaced longitudinally. When, however, the sleeve 63 is shifted longitudinally in one direction or the other by reason of the engagement of the spiral nut 65 with the spiral formation 66 of shaft 52, said shaft will be rotatively shifted or moved, thereby rotatively displacing the inner shutter member 53 correspondingly and with relation to the outer shutter member 56. The spiral portion 66 of shaft 52 and the nut 65 are provided as shown with multi-lead long spiral threads.

The relative rotative adjustment of the two shutter members is effected through the longitudinal shifting movements of sleeve 63. This sleeve may be adjusted longitudinally in many different ways, the purpose of the longitudinal adjustment being to relatively position the shutter disks with reference to each other, so as to effect the desired degree of opening of the shutter from zero degrees up to the maximum of 180°.

I have shown one form of control of the longitudinal position of sleeve 63 which is effected by manual operation, through a rotatively displaceable hand operated setting disk 68. This setting disk is carried within a casing 69, suitably mounted upon the casing exteriorly thereof and provided with the transparent window 68'. The setting disk 68 is provided with an operating knob or handle 70, by which it may be rotatively displaced. The setting disk is mounted upon a shaft 71 which extends through the wall of the camera casing and on which is mounted a cam sleeve 72. A roller or other suitable device 73 carried by sleeve 74 is arranged to engage within the cam slot 75 of the cam sleeve. This cam slot, when said sleeve 72 is rotated, will cause the sleeve 74 to travel back and forth along its supporting stud shaft 76, said stud shaft being suitably mounted in supports 77, 77ᵃ mounted within the camera casing. The sleeve 74 is provided with an extension which works within an annular groove in a spool 79 mounted upon the end of sleeve 63.

By this arrangement when the setting disk 68 is rotatively adjusted the sleeve 63 will be shifted or moved endwise in one direction or the other according to the direction of rotative adjustment of said disk. If shifted in one direction or the other said sleeve will effect a rotative displacement of shaft 52 with relation to the shaft 58, thereby varying correspondingly the area of shutter opening, the opening being increased when the sleeve 63 is shifted in one direction, and decreased when shifted in the other direction.

Figure 4:
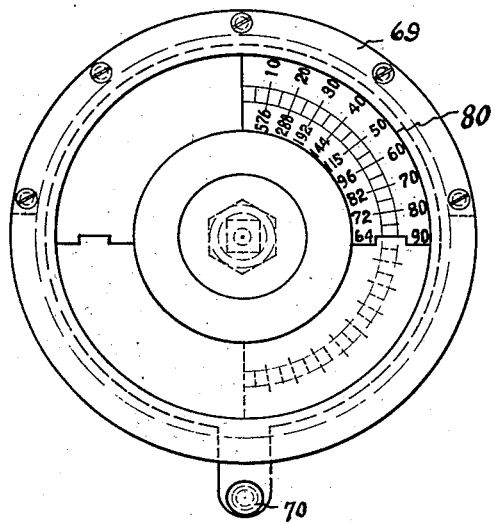
Fig. 4 is a detail view in elevation of the dial indicator for indicating the relative adjustments of the shutters.

It is desirable and important to provide means whereby the camera operator may constantly be apprised of the relative positions of the shutters; that is, of the area of opening afforded by the shutters. To accomplish this result, I associate with the setting disk 68 a dial arrangement having suitable graduations as indicated at 80 (Fig. 4) which, by reason of the position of the setting disk 68, reveals to the camera operator at all times not only the extent of relative adjustment of the shutters, but also the duration to the actual fraction of a second of each individual exposure. The outer graduations of the dial are provided to indicate the arc of the shutter opening, while the inner ring of graduations indicate the duration of the individual exposures. I prefer to employ black and white surfaces in connection with the indicating device, the dial graduations being formed on the white surface and being carried by the setting disk 68 will be exposed to the camera man, the white surface of the indicator corresponding to the actual shutter opening. This gives the operator a visual image indicating the exact relation to each other of the shutters at all times.

Figure 3:
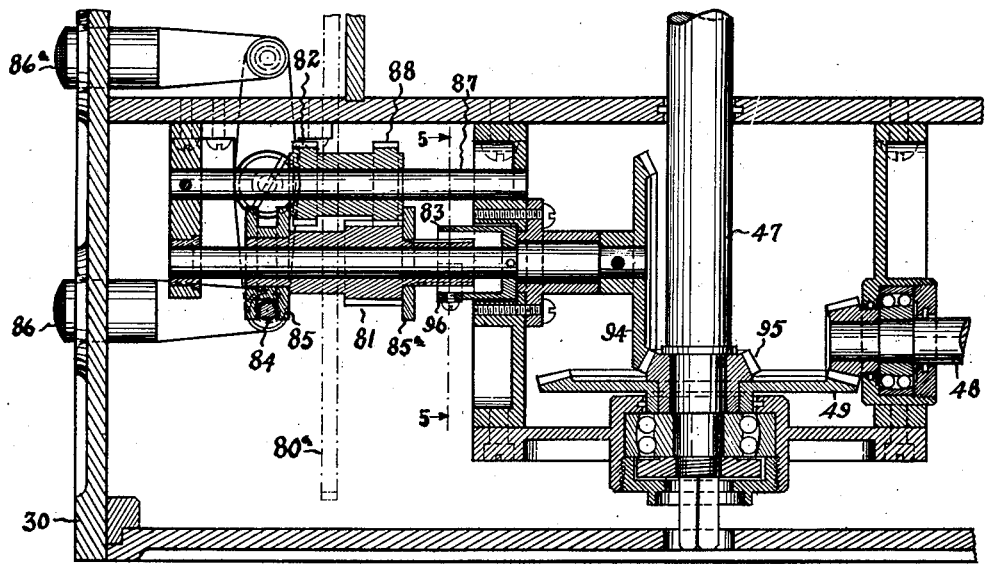
Fig. 3 is a view taken on the line 3—3 of Fig. 2.

It may sometimes be desirable to effect the shifting of the position of the sleeve 63 automatically, the automatic operation, however, being under the control of the operator. I have shown a simple arrangement for accomplishing this result wherein I mount upon the shaft 71 a spur wheel 80ᵃ, of large diameter, which is adapted to be engaged and driven by one or the other of two gear wheels 81, 82 which are driven in reversed directions, according to whether the one or the other of them is shifted into engaging or meshing relation with respect to stud gear wheel 80ᵃ. The gear 81 is sleeved upon to rotate with, but capable of sliding longitudinally of the shaft indicated at 83, and said sleeve is shiftable by means of a pin or stud 84 (see Fig. 3) engaging in an annular groove of a collar 85 carried by the sleeve or gear 81. The pin 84 is arranged to be shifted as occasion may require from the exterior of the camera casing as, for example, by means of one or the other of push buttons 86, 86ᵃ against the action of a suitably disposed spring 84ᵃ which normally retains the drive gears 81, 82 in neutral or idle position with reference to 80ᵃ. When, however, push button 86 is pressed inwardly the sleeve of gear 81 and the sleeve of gear 82 will be shifted so as to cause gear 82 to mesh with and drive gear 80ᵃ. When push button 86ᵃ is pressed inwardly the parts mentioned will be shifted towards the left as viewed in Fig. 3 so as to cause gear 81 to mesh with and drive gear 80ᵃ in the opposite direction. In Fig. 3 the parts are shown in normal or neutral position, that is, in the position in which neither of gears 82, nor 81 are meshed with the gear 80ᵃ. The gear 82 is carried to slide upon a short stud shaft 87. The sleeve which carries the gear 82 carries also a gear 88, which remains in constant mesh with gear 81 and is driven thereby but in reverse direction from that in which gear 81 is driven. The bracket formed by the side plates or collars 85, 85ᵃ, engage the ends of the sleeve gear 81, 88, thereby causing all these parts to move together as a unit when one or the other of the buttons 86, 86ᵃ is pushed inwardly. When either of the buttons is released after being depressed, the gear 82, or gear 81, is shifted back into normal, neutral position with reference to gear 80ᵃ. The gear 82 is constantly driven by reason of the meshing of gear 81 in either of its positions with the gear 88, which is connected to sleeve carrying gear 82. The gear 81 is of sufficient axial length to permit the retention of the meshing together of gears 81 and 88.

Figure 2:
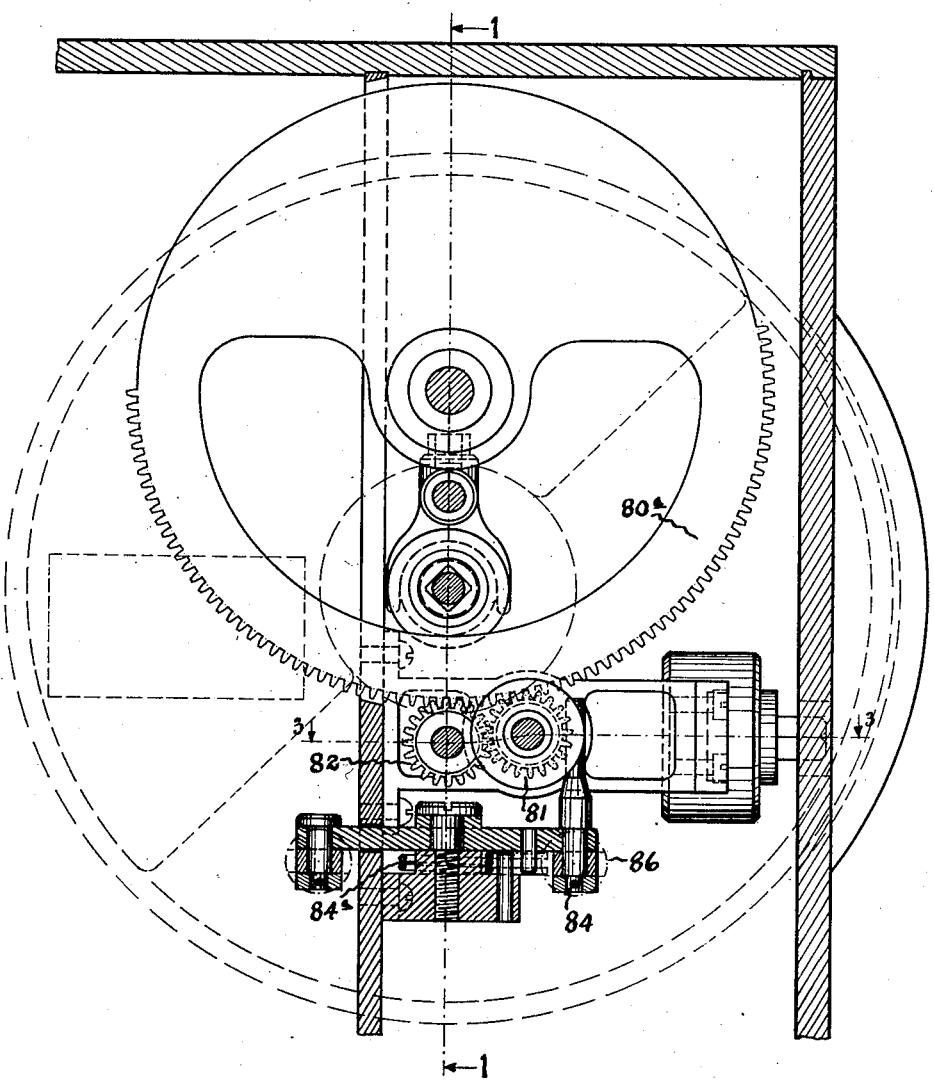
Fig. 2 is a view taken on the line 2—2 of Fig. 1.

It will be observed that the gear 80ᵃ is a segmental gear, see Fig. 2, that is to say, the gear teeth formed on this gear occupy only a segmental portion of the periphery of the said gear. The purpose of this is that this gear is intended to actuate the cam sleeve 72 through only one rotation in one direction or the other, or possibly less than one complete rotation, to effect a longitudinal movement of sleeve 63 to the respective limits of such movement in opposite directions.

The teeth of gear 80ᵃ are omitted at the extremities of the sector portion of said gear, so that when the sleeve 63 is controlled automatically through the operation or control of push button 86, 86ᵃ, and the gearing controlled thereby, and when the sleeve 63 reaches the limit of its control, the gear teeth of gear 80ᵃ will have passed the point where driving connection is effected with gears 82, 81 and the longitudinal adjusting movement of sleeve 63 will be arrested.

It is important to eliminate or reduce the friction as much as possible of the rotative and longitudinal movements of the sleeve 63 in order to secure a smooth, easy operation of the shutter control devices. This can be accomplished in many different ways. A simple arrangement is shown, see Fig. 1, wherein a ball bearing structure, indicated generally at 89, is provided within which the sleeve 63 is permitted to rotate and through which the said sleeve is permitted to slide. This ball bearing device consists of ring members 90, 91, mounted in a recess formed in supporting bracket 77, and held therein by means of a threaded cap member 92. The bearing rings 90, 91 have plane inclined surfaces on their opposed or proximate faces, thereby forming an equilateral triangular raceway, within which the anti-friction balls of the bearing are held. The result of this structure is to provide three bearing surfaces or points of contact for each ball of the ball bearings.

I prefer to form the opposed faces of the bearing rings with an inclination of approximately 60°. The three contacts provided for each ball are, respectively, one on each ring and one on the sleeve; the contacts on the rings being on the inclined faces of said rings. These three contact points of course are spaced 120° apart. This structure secures a most efficient anti-friction bearing not only for the rotative movement of the sleeve, but also for the sliding movements thereof. These sliding movements or rotative movements are in one direction or the other, and avoid any possibility of causing or permitting jamming of the balls. Other and ordinary ball bearings may also be provided for the shafts 58 and 52. I have already referred to one of said bearings as indicated at 61 for the outer end of the shaft 52. A similar ball bearing support is shown at 93 for the inner end of the shaft 58. These several bearings 61, 89 and 93 afford ample support for the shafting of the shutter control mechanism.

It will be understood that the spiral nut 65, as well as the square nut 64 will serve the purpose of supporting bearings for the shafts 58, 52 and that the outer shaft 52 will serve as a supporting bearing for the inner shaft 58. This makes a very efficient and effective bearing structure for said shafts.

Figure 5:
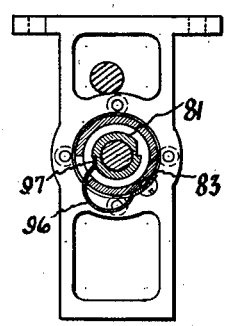
Fig. 5 is a view taken on the line 5—5 of Fig. 3.

It may happen that the automatic shutter control mechanism will get out of working order by reason of the gears jamming or getting broken, or otherwise. Should such an exigency arise, it is important to provide means whereby the camera is not entirely put out of commission. In accordance with my invention, therefore, I propose to provide means whereby in case of jamming or other derangement of the automatic shutter control devices, the same may be disconnected leaving the shutter control free to be adjusted and operated manually through control handle 70 and control disk 68. In one form of the apparatus for accomplishing this, see Figs. 3 and 5, wherein provision is made for driving the gear 81, or the sleeve which carries it, by means of a ratchet clutch consisting of a bow-spring 96 fastened at one end to a convenient part of the driven shaft member 83 and having its free end extending into engagement, in the manner of a pawl, with a shoulder 97 on the sleeve which carries the gear 81. Thus I provide a safety arrangement by means of which the gear 81 is driven through the spring 96. In case of jamming of the gearing referred to, all that is necessary to be done is to remove the bow-spring 96, thereby throwing out of commission the automatic shutter control mechanism but the manual shutter control device remains in complete working operation. If the gearing should jam while in operation the end of spring 96 will slip out of notch 97 or will snap off disconnecting the gearing from the driving means.

From the foregoing description it will be seen that I provide an exceedingly simple and efficient and controllable shutter operating mechanism, and various other features, which I have hereinbefore described and set forth. It will be understood, of course, that variations and changes in the details of construction and arrangement of parts may readily occur to those skilled in the art and still fall within the spirit and scope of my invention, but having now set forth the objects and nature of my invention and structures embodying the principles thereof, what I claim as new and useful and of my own invention is:

1. In a camera, a shutter mechanism including shutters and rotative shafts on which said shutters are respectively mounted, and means for rotating said shafts, one of said shafts having a longitudinal spiral formation, a nut engaging said spiralled portion, a sleeve for shifting said nut longitudinally of said spiralled portion, means for shifting said sleeve longitudinally, and a ball bearing supporting the sleeve for rotative and longitudinal movement, said ball bearing also supporting the shutter shafts.

2. In a camera, a shutter mechanism including rotatively actuated shutters, in combination with means to adjust the angular displacement of the shutters, driving means to automatically actuate said adjustable displacing means, and a yieldable connection forming part of the driving means for disengaging the adjusting means from the driving means when the load thereon exceeds a predetermined amount.

3. In a camera shutter mechanism including rotatively actuated shutters, in combination with means to adjust the angular displacement of the shutters, and means to automatically actuate said adjustable displacing means including a cam for driving said adjustable displacement means, a segmental gear for actuating the cam, a pair of shiftable gears engageable with said segmental gear to reversibly drive it, and a pair of manually operable members for effecting engagement between said segmental gear and other gear of said pair.

4. In a camera shutter mechanism including rotatively actuated shutters, in combination with means to adjust the angular displacement of the shutters, and means to automatically actuate said adjustable displacing means including a cam for driving said adjustable displacement means, a segmental gear for actuating the cam, a pair of shiftable gears engageable with said segmental gear to reversibly drive it, and means for normally holding said gears out of engagement with said segmental gear.

5. In a camera a shutter mechanism including rotatable shutter shafts and means for rotating the same in combination with means to adjustably vary the angular displacement of said shaft to vary the shutter opening, including a longitudinal slidable member, a cam for effecting sliding movement thereof, a segmental gear for rotating said cam, a pair of gears shiftable for engagement of either thereof with said segmental gear to effect movement of the gear in either direction, a pivoted hook engageable with said pair of gears to effect their engagement and disengagement with the segmental gear, means for normally holding the hook in position to disengage both gears of the pair from the segmental gear, and a pair of operable members for effecting movement of the hook member in either direction.

6. In a camera a shutter mechanism including rotatable shutter shafts and means for rotating the same in combination with means to adjustably vary the angular displacement of said shaft to vary the shutter opening, including a longitudinal slidable member, a cam for effecting sliding movement thereof, a segmental gear for rotating said cam, a pair of gears shiftable for engagement of either thereof with said segmental gear to effect movement of the gear in either direction, a pivoted hook engageable with said pair of gears to effect their engagement and disengagement with the segmental gear, means for normally holding the hook in a position to disengage both gears of the pair from the segmental gear, and manual means connected to said cam for effecting movement thereof.

7. In a camera a shutter mechanism comprising a pair of telescoped rotatable shafts each having a shutter thereon, in combination with means to adjustably vary the angular displacement of said shafts to vary the shutter openings including a cam, means interconnecting the cam with said shafts, a segmental gear for operating said cam, a pair of gears for driving the segmental gear in either direction, means for manually shifting either gear of said pair into engagement with the segmental gear, and means for normally holding said shifting means in neutral position.

8. In a camera a shutter mechanism including a pair of telescoped shafts each having a shutter thereon, the inner shaft extending beyond the end of the outer shaft and having a rectangular cross section, the adjacent end of the outer shaft having a spiral formation, a spirally threaded nut engaging therewith, a rotatably and slidably mounted sleeve secured to said nut and enclosing the rectangular end of the inner shaft, and means for longitudinally shifting said sleeve to vary the angular displacement of said shafts to vary the shutter opening including a nut secured to said sleeve and encircling the rectangular portion of the inner shaft, a cam, means connecting the cam with said sleeve, and manually controlled means for automatically effecting rotation of said cam.

9. In a camera a shutter mechanism including a pair of telescoped shafts each having a shutter thereon, the inner shaft extending beyond the end of the outer shaft and having a rectangular cross section, the adjacent end of the outer shaft having a spiral formation, a spirally threaded nut engaging therewith, a rotatably and slidably mounted sleeve secured to said nut and enclosing the rectangular end of the inner shaft, and means for longitudinally shifting said sleeve to vary the angular displacement of said shafts to vary the shutter opening including a nut secured to said sleeve and encircling the rectangular portion of the inner shaft, a cam, means connecting the cam with said sleeve, and a ball bearing for supporting said sleeve for rotative and longitudinal movement including a pair of races having opposed faces lying in planes at an acute angle and a plurality of ball members interposed in said races so as to contact the inclined faces and the circumference of the sleeve.

PER JOHAN BERGGREN.